(12) United States Patent
Bock et al.

(10) Patent No.: US 10,122,471 B2
(45) Date of Patent: Nov. 6, 2018

(54) SPATIALLY DEPHASING LOCAL OSCILLATOR FOR COHERENT FREE-SPACE OPTICAL COMMUNICATIONS

(71) Applicant: LOCKHEED MARTIN CORPORATION, Bethesda, MD (US)

(72) Inventors: Kevin Richard Bock, San Jose, CA (US); Patrick Eliott Perkins, Woodside, CA (US); Christopher William Tischhauser, Campbell, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 126 days.

(21) Appl. No.: 15/204,898

(22) Filed: Jul. 7, 2016

(65) Prior Publication Data

US 2018/0013497 A1 Jan. 11, 2018

(51) Int. Cl.
| | |
|---|---|
| *H04B 10/40* | (2013.01) |
| *H04B 10/64* | (2013.01) |
| *H04B 10/11* | (2013.01) |
| *H04B 10/61* | (2013.01) |
| *H04B 10/112* | (2013.01) |

(52) U.S. Cl.
CPC ............ *H04B 10/64* (2013.01); *H04B 10/11* (2013.01); *H04B 10/1121* (2013.01); *H04B 10/40* (2013.01); *H04B 10/6165* (2013.01)

(58) Field of Classification Search
CPC .... H04B 10/61; H04B 10/64; H04B 10/6165; H04B 10/60
See application file for complete search history.

(56) References Cited

U.S. PATENT DOCUMENTS

| | | | | |
|---|---|---|---|---|
| 4,468,766 A | * | 8/1984 | Spezio | G01R 23/17 359/326 |
| 5,247,382 A | * | 9/1993 | Suzuki | H04B 10/532 398/161 |
| 5,450,223 A | * | 9/1995 | Wagner | H04Q 11/0003 398/1 |
| 5,694,408 A | * | 12/1997 | Bott | H01S 3/2383 372/108 |
| 8,879,916 B1 | * | 11/2014 | Ng | H04B 10/25759 398/115 |
| 9,031,406 B2 | * | 5/2015 | Hui | H04J 14/022 398/50 |
| 2002/0122180 A1 | * | 9/2002 | Szafraniec | G01J 9/04 356/484 |
| 2004/0036978 A1 | * | 2/2004 | Gullapalli | G02B 27/48 359/629 |

(Continued)

*Primary Examiner* — David Payne
*Assistant Examiner* — Tanya Motsinger
(74) *Attorney, Agent, or Firm* — Morgan, Lewis & Bockius LLP

(57) ABSTRACT

A coherent transceiver system includes a local oscillator (LO) light source to generate an LO optical signal. An adaptive fiber array is coupled to the LO light source to dephase the LO optical signal. A balanced detector is coupled to the adaptive fiber array to receive a dephased LO signal from the adaptive fiber array and an optical input signal and to generate a heterodyne signal. A controller receives the heterodyne signal and generates one or more control signals. The adaptive fiber array utilizes the control signals to dephase the LO optical signal.

20 Claims, 6 Drawing Sheets

(56) References Cited

U.S. PATENT DOCUMENTS

| | | | | |
|---|---|---|---|---|
| 2005/0186930 A1* | 8/2005 | Rofougaran | ........... | H03B 27/00 |
| | | | | 455/260 |
| 2009/0047030 A1* | 2/2009 | Hoshida | ................. | H04B 10/60 |
| | | | | 398/205 |
| 2010/0039917 A1* | 2/2010 | Ide | ......................... | G11B 7/005 |
| | | | | 369/100 |
| 2016/0131918 A1* | 5/2016 | Chu | .................. | G02F 1/134309 |
| | | | | 359/316 |
| 2017/0315374 A1* | 11/2017 | Zhou | .................... | G02F 1/1343 |

* cited by examiner

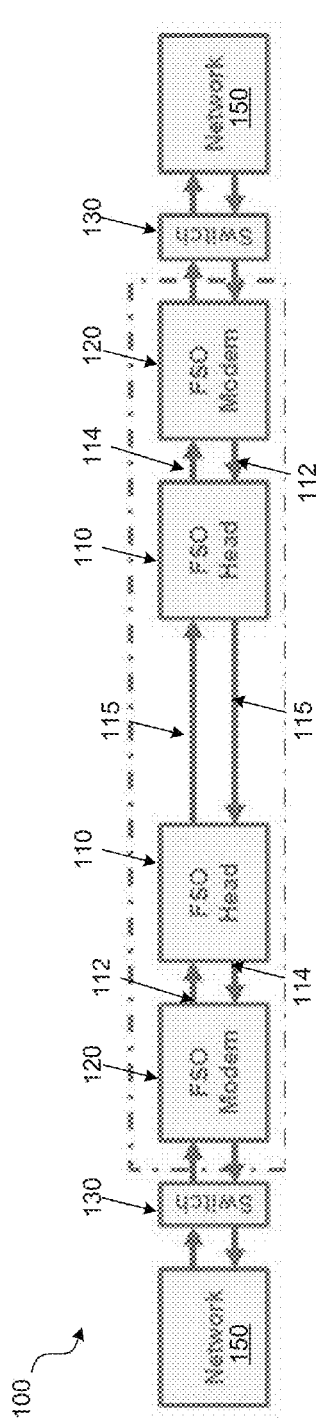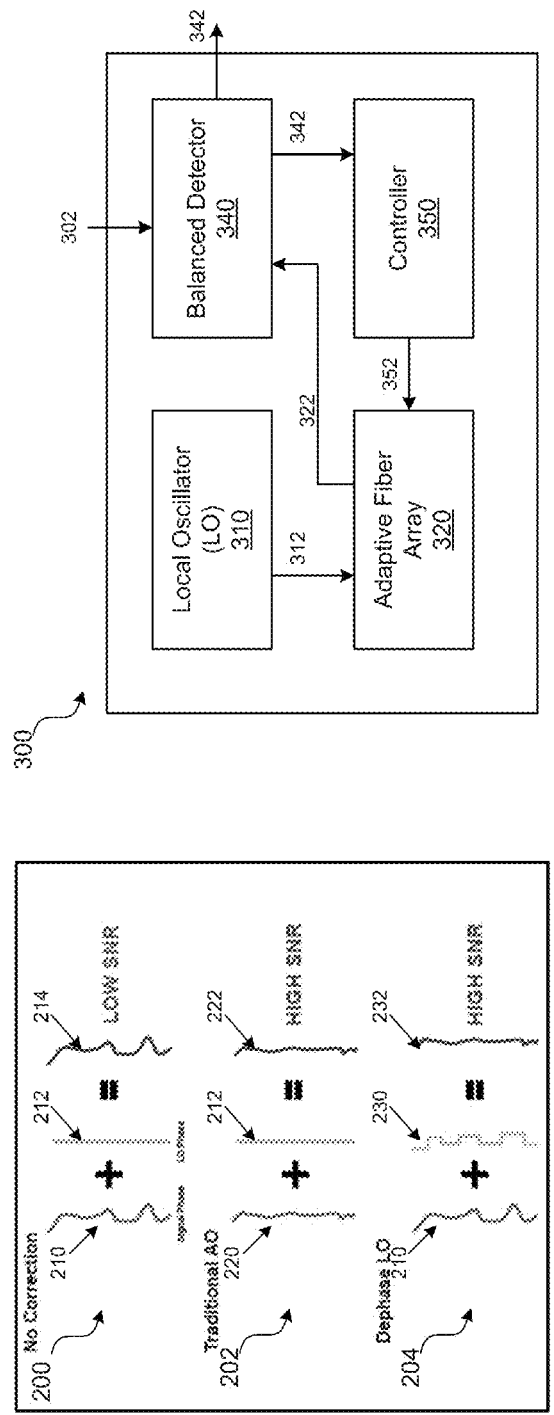

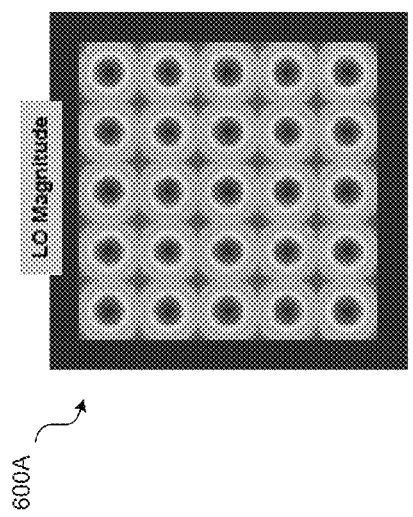
FIG. 6A
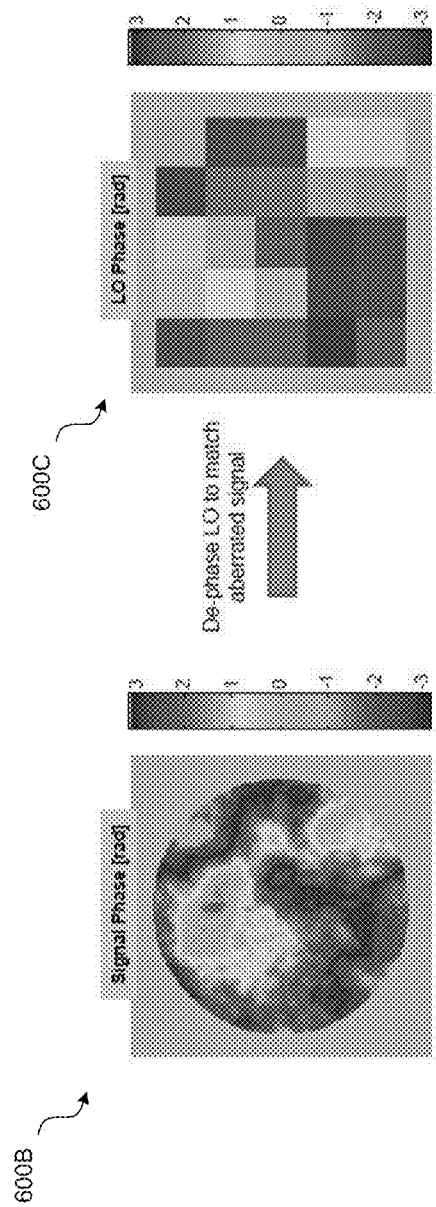
FIG. 6B
FIG. 6C

SPATIALLY DEPHASING LOCAL OSCILLATOR FOR COHERENT FREE-SPACE OPTICAL COMMUNICATIONS

STATEMENT REGARDING FEDERALLY SPONSORED RESEARCH OR DEVELOPMENT

Not applicable

FIELD OF THE INVENTION

The present invention generally relates to coherent free-space optical (FSO) communications, and more particularly, to spatially dephasing local oscillator for coherent free-space optical communications.

BACKGROUND

Many optical transceivers operate based on coherent communications, in which the receiver has a prior knowledge of the type of the data being transmitted. For example, in heterodyne systems, the receiver may have information on a carrier frequency and a phase of the carrier frequency of a received modulated signal and can apply a corresponding local oscillator (LO) with proper frequency and phase to demodulate the received signal. Coherent communications provides orders of magnitude better receiver sensitivities over non-coherent detection (e.g., direct detection). For example, a coherent receiver may have a better sensitivity of about 20 to 40 photons/bit as compared to a typical receiver sensitivity of a non-coherent receiver of more than 1000 photons/bit. Additionally, LO gain enables use of noisier, but faster receivers (e.g., optical detectors) and enables much higher data rates (e.g., 40 to 100 Gbps) which is significantly higher than data rates (e.g., 10 Gbps) of non-coherent receivers.

Free-space optical (FSO) communications can enable high-speed wireless communications over sizable range (e.g., many kilometers). In terrestrial applications, atmospheric turbulence can significantly degrade performance. For example, the atmospheric turbulence can substantially reduce coherence of received (RX) light causing coherent systems to underperform direct detect systems.

An adaptive optics technique has been used to address the problem of recovering the spatial coherence of the received light disturbed by the atmospheric turbulences. This technique involves measuring the spatial phase variations of the incoming received light and using some sort of corrector (e.g., a deformable mirror) to flatten the phase of the received signal. This technique reduces the phase differences between the signal and the local oscillator and can improve the coherent SNR of the system. The adaptive optics systems, however, have to use expensive low-noise sensors and unreliable micro-mechanical mirrors as deformable mirrors. Further, the adaptive optics systems introduce additional optical losses into the system that adversely affect the optical throughput efficiency of the system.

SUMMARY

In some aspects, a coherent transceiver system includes a local oscillator (LO) light source to generate an LO optical signal. An adaptive fiber array is coupled to the LO light source to dephase the LO optical signal. A balanced detector is coupled to the adaptive fiber array to receive a dephased LO signal from the adaptive fiber array and an optical input signal and to generate a heterodyne signal. A controller receives the heterodyne signal and generates one or more control signals. The adaptive fiber array utilizes the control signals to dephase the LO optical signal.

In other aspects, a method of providing a coherent transceiver system includes providing an LO light source to generate an LO optical signal. An adaptive fiber array is coupled to the LO light source. The adaptive fiber array is configured to dephase the LO optical signal and to generate a dephased LO signal. A balanced detector is coupled to the adaptive fiber array. The balanced detector is configured to generate a heterodyne signal using the dephased LO signal and an optical input signal. A controller is provided to receive the heterodyne signal and to generate one or more control signals. The adaptive fiber array is configured to utilizes the one or more control signal to dephase the LO optical signal.

In yet other aspects, a free-space optical (FSO) communication includes at least two FSO transceivers coupled via an FSO modem to a network. The FSO transceiver includes an LO light source to generate an LO optical signal and an adaptive fiber array coupled to the LO light source and configured to dephase the LO optical signal. A balanced detector is coupled to the adaptive fiber array and is configured to receive a dephased LO signal from the adaptive fiber array and an optical input signal and to generate a heterodyne signal. A controller is configured to receive the heterodyne signal and to generate one or more control signals. The adaptive fiber array utilizes the one or more control signal to dephase the LO optical signal.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIG. 1 is a block diagram illustrating an example of a free-space optical (FSO) communication system.

FIG. 2 is a conceptual diagram illustrating examples of methods of mixing a received optical signal without and with corrections for the atmospheric disturbance.

FIG. 3 is a block diagram illustrating an example of a coherent transceiver system, according to certain aspects.

FIGS. 6A through 6C are diagrams illustrating a cross-sectional view of example fiber array collimator beams and corresponding phase diagrams, according to certain aspects.

DETAILED DESCRIPTION

Figure 4A:
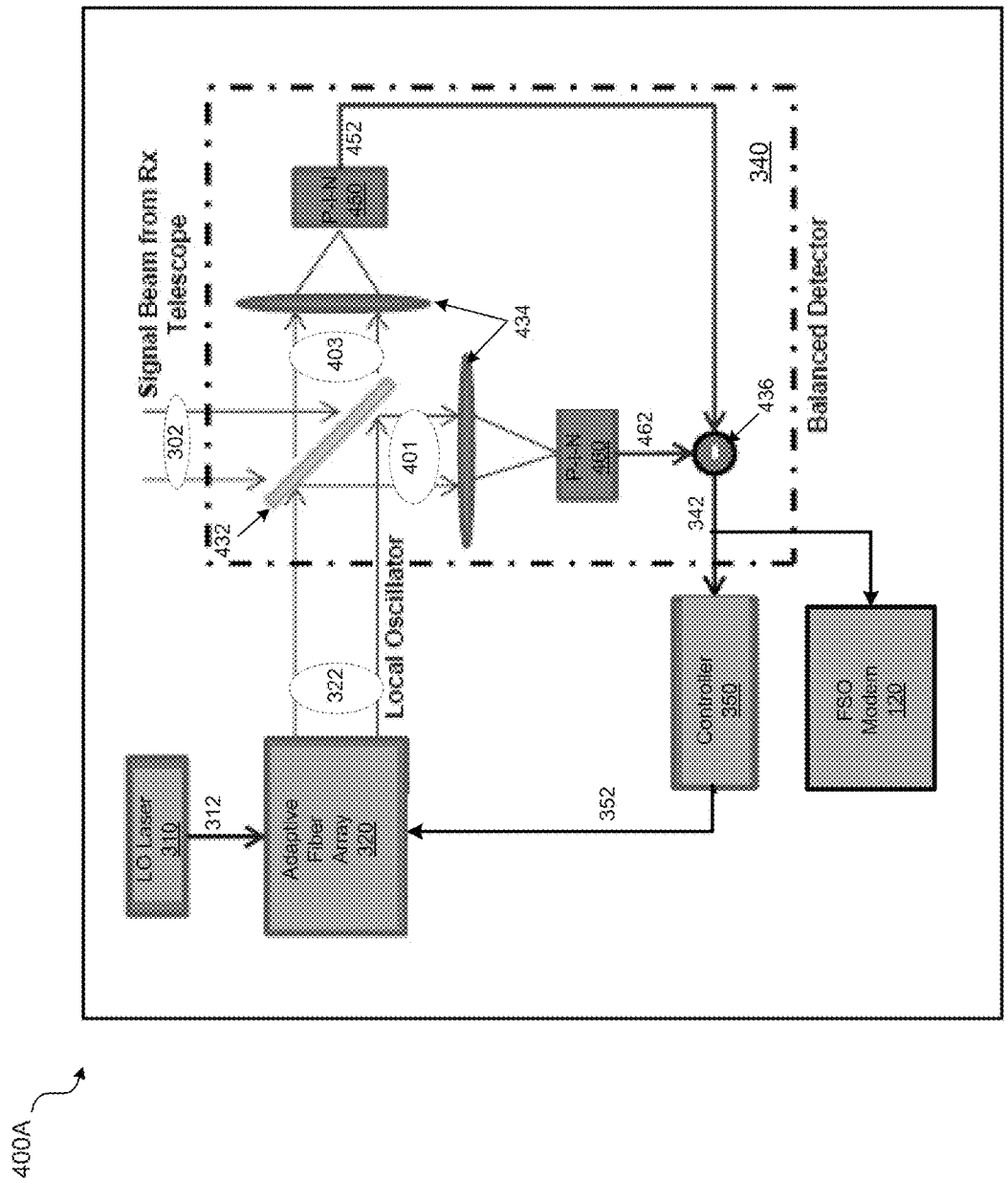
FIGS. 4A-4B are diagrams illustrating an example of a coherent receiver system, according to certain aspects.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to methods and configuration for providing a coherent transceiver system. The coherent transceiver system of the subject technology recovers coherence loss due to the atmospheric turbulence induced phase aberrations and enables high-speed free-space optical (FSO) communication links. Atmospheric turbulence induced phase aberrations reduce the coherence of the received optical signal. An optical signal (e.g., single mode) interfered with the atmospheric turbulence before being received by the FSO receiver shows a drastically reduced overlap (e.g., mixing efficiency) with a local oscillator (LO) signal of the FSO receiver, which results in a substantial reduction of the coherent signal-to-noise (SNR) of the FSO receiver. This is because the mixing efficiency with the LO signal at a mixer is, to a first order, a function of the phase difference of the received optical signal and the LO signal. The disclosed solution enables phase correction (e.g., de-phasing) of the LO signal to match a phase of the LO signal with the phase of the received optical signal. The subject technology substantially increases the mixing efficiency and the coherent SNR, enabling the coherent FSO link to communicate at a high data rate with much less power than would be needed in the absence of the phase correction.

Some of the existing solutions recover the spatial coherence of the received optical signal using adaptive optics. This adaptive optics solution involves measuring the spatial phase variations of the incoming received light and using some sort of corrector (e.g., using a deformable mirror) to flatten the phase of the received signal. The adaptive optics solution reduces the phase differences between the received optical signal and the LO signal to improve the coherent SNR of the system. The deformable mirrors used in the existing adaptive optics solution are normally micro-mechanical mirrors, which are unreliable and expensive. The adaptive optics solution reduces the phase differences between the received optical signal and the LO signal to improve the coherent SNR of the system. The disclosed solution substantially improves the throughput efficiency provided to the received signal by using the actuators (e.g., phase modulators) on the LO signal path. It is known that the coherent SNR is proportional to the number of received photons times the mixing efficiency, once there is enough LO signal power to be in the shot noise regime. Any throughput losses that can be moved from the optical signal path to the LO signal path, where there is plenty of LO signal power, results in an improvement to the SNR of the system. The subject technology enables the use of high-speed (e.g., up to about 100 GHz), but high-loss (e.g., about 3 to 5 dB) actuators (e.g., electro-optical (EO) modulators), which allows for substantially improved bandwidths and performance. The EO modulators cannot be used in the adaptive optics systems without large losses to the coherent SNR.

FIG. 1 is a block diagram illustrating an example of a free-space optical (FSO) communication system 100 of the subject technology. The FSO system 100 includes FSP transceivers (e.g., heads) 110 optically communicating with one another through open space. Each FSO transceiver 110 is coupled to an FSO modem 120, which in turn is in communication with a network 150 via a network switch 130. Examples of the network 150 include the Internet, a local area network (LAN), an Ethernet network, or other networks). In one or more aspects, the FSO transceiver 110 receives optical signals 112 from the FSO modem 120 and transmits electrical signals 114 to the FSO modem 120. Communications between the FSO modem 120 and the switch 130 and between the switch 130 and the network 150 is through electrical signals. The subject technology provides the FSO transceiver 110 that is capable of correcting the phase of the LO signal to match with the phase of the received optical signal 115.

FIG. 2 is a conceptual diagram illustrating examples of methods 200, 202, and 204 of mixing a received optical signal without and with corrections for the atmospheric disturbance. In the first method 200, the optical signal 210 disturbed by the atmospheric disturbance is directly mixed with an LO signal 212 and a resulting mixed signal 214 has a low SNR, as expected. In the second method 202, the phase of the received optical signal 210 is corrected for the atmospheric disturbance and then mixed with an LO signal 212, which results in a mixed signal 214 with a higher SNR compared to the method 210. In the disclosed method 204, the received optical signal 210 is mixed with an LO signal 230, the phase of which is corrected to compensate for the atmospheric disturbance and results in a mixed signal 232 with a higher SNR compared to the method 210. As explained above, The correction of the phase of the LO, rather than the phase of the received optical signal, is advantageous in the sense that the LO signal power is substantially larger than the power of the received optical signal and is less susceptible to throughput efficiency loss due to phase modulation as compared the received signal optical signal.

FIG. 3 is a block diagram illustrating an example of a coherent transceiver system 300, according to certain aspects of the subject technology. The coherent transceiver system 300 includes an LO 310, an adaptive fiber array 320, a balanced detector (e.g., a coherent detector) 340, and a controller 350. In one or more aspects, the LO 310 is a light source such as a laser (e.g., a semiconductor laser) that operates in the optical communication wavelength (e.g., about 1550 nm) and generates an LO optical signal 312. In some aspects, the adaptive fiber array 320 is coupled to the LO light source 310 and is tasked with dephasing the LO optical signal 312 and generating a dephased LO signal 322. The balanced detector 340 is coupled to the adaptive fiber array 320 and receives the dephased LO signal 322 from the adaptive fiber array 320. The balanced detector 340 further receives an optical input signal 302 and generates heterodyne signals 342 (e.g., 114 of FIG. 1) that can be received by a modem (e.g., 120 of FIG. 1). The controller 310 receives the heterodyne signal 342 and generates one or more control signals 352. The adaptive fiber array 320 utilizes the control signals 352 to dephase the LO optical signal 312 as described in more details herein.

Figure 4B:
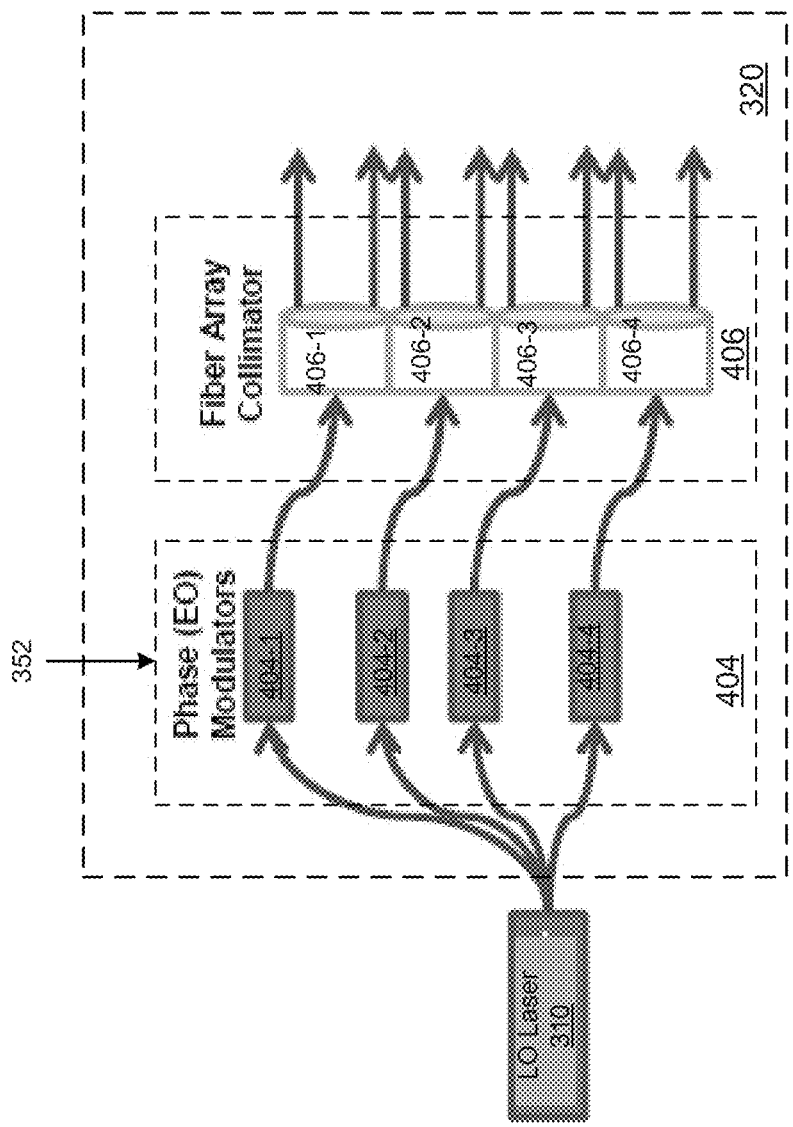

FIGS. 4A-4B are diagrams illustrating an example of a coherent receiver system 400A and a corresponding adaptive fiber array 320, according to certain aspects of the subject technology. The coherent receiver system 400A includes the LO laser 310, the adaptive fiber array 320, the balanced detector 340, and the controller 350. The structure of the adaptive fiber array 320 is shown and discussed below. The balanced detector 340 receives input optical signal 302 (e.g., 115 of FIG. 1) and the dephased LO signal 322 from the adaptive fiber array 320 and generates the electrical output signal (e.g., the heterodyne signal) 342 that is delivered to the FSO modem 120 and the controller 350.

The balanced detector 340 includes a beam splitter 432, optical couplers (e.g., lenses) 434, square-law photo-detectors (e.g., P-I-N diodes) 450 and 460 and a differential circuit 436. In some aspects, the beam splitter 432 is a partially (e.g., 50/50) reflecting mirror and can split an incident light beam into two components (e.g., beams), a reflected beam and a transmitted beam (e.g., with equal intensities). The reflected beam exits the reflector 432 at a 90 degree angle with respect to the incident light beam. For example, the input optical signal 302 is spited into a transmit beam, which is mixed with the reflected beam of the dephased LO signal 322 to form a first combined beam 401, and a reflected beam that is mixed with the transmit beam of the dephased LO signal 322 and forms a second combined beam 403. The first and second combined beams 401 and 403 are collimated by the lenses 434 and focused on the P-I-N diodes 450 and 460, respectively. The P-I-N diodes 450 and 460 convert the mixed optical signals (e.g., first and second combined beams 401 and 403) into photo currents 452 and 462, respectively. The photo currents 452 and 462 are subtracted from one another in the differential circuit 436, which results in the electrical output signal 342. The electrical output signal 342 is heterodyne signal. It is understood that the input optical signal 302 and the dephased LO signal 322 are coherent optical signals transmitted over single mode and polarization-maintaining optical fibers.

The controller 350 receives the electrical output signal 342 and generates one or more control signals 352, as discussed in more details below. The control signals 352 are used by the adaptive fiber array 320 to correct the phase of the LO signal 312.

The adaptive fiber array 320, as shown in FIG. 4B includes a phase modulator block 404 and a fiber array collimator 406. The phase modulator block 404 includes a number (e.g., N, such as 4, 16, or 256) of phase modulators such as EO phase modulators 404-1 through 404-N (e.g., 404-4). In one or more aspects, each of the EO phase modulators 404-1 through 404-N is a lithium niobate crystal modulator. The phase modulator block 404 receives the control signal 352 and use the control signals to correct the phase the LO signal. The fiber array collimator 406 includes a number (e.g., N, such as 4, 16, or 256) of collimators such as lenses 406-1 through 406-N (e.g., 406-4) that are used to direct the output light of phase modulators 404-1 through 404-N (e.g., 404-4) as optical channel signals to the balanced detector 340 of FIG. 4A. Each phase modulator (e.g., 404-1) receive one channel of the LO optical signal 312, which is split by an optical splitter (not shown for simplicity), into N (e.g., 4) number of channels. Each phase modulator also receives a respective control signal that is encoded for the corresponding channel of that phase modulator, as explained herein.

Figures 5A, 5B:
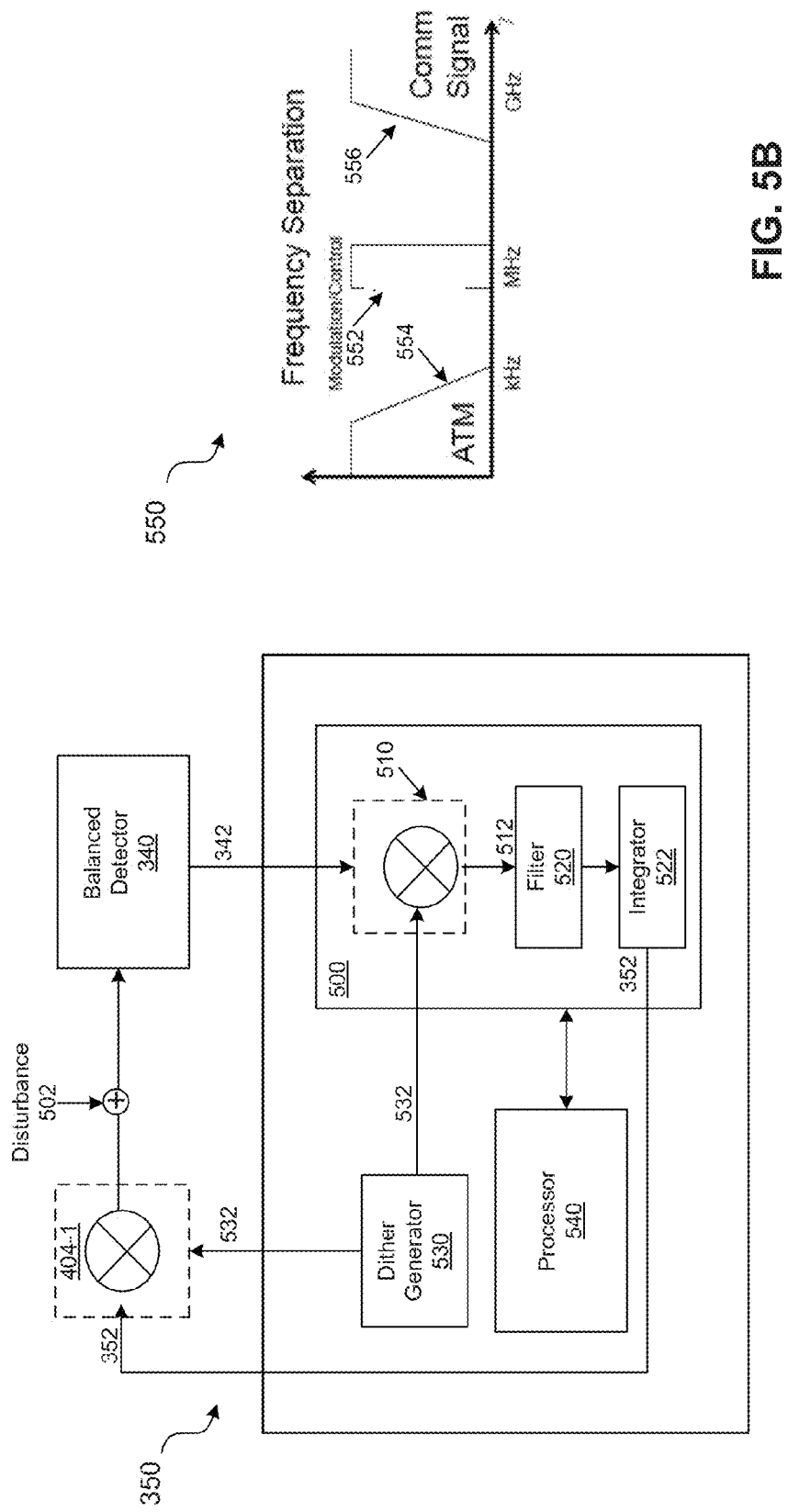
FIGS. 5A-5B are block diagrams illustrating an example controller and a plot 500 showing corresponding frequency spectra, according to certain aspects.

FIGS. 5A-5B are a block diagram illustrating an example controller 350 and a plot 550 showing corresponding frequency spectra, according to certain aspects of the subject technology. The controller 350 includes a control-signal generator 500 and a dither generator 530, and a processor 540. The control-signal generator 500 includes a dither modulator 510, a filter 520, and an integrator 522. The controller 350 receives the electrical output signal 342 (e.g., including multiple channel heterodyne signals) of the balanced detector 340 and generates a control signal 352 and dither signal 532, which are fed to the one channel (e.g., one phase modulator such as 404-1) of the phase modulator 404 of FIG. 4B. The dither generator 530 generates the dither signal 532. The dither signal 532 has a dither frequency $f_d$, (associated with a channel wavelength) in the MHz range and at the phase modulator 404-1 dithers (e.g., modulates) the phase ($\phi_{mod}$) of a signal of each phase modulator channel (e.g., 404-1) with a different dither frequency $f_d$, such that $\phi_{mod}=a\ sin(2\pi f_d)$. This makes the signal of each phase modulator channel identifiable after it is disturbed by the atmospheric disturbance 502 and passed through the balanced detector 340, and mixed as a channel heterodyne signal at the dither modulator 510 with the dither signal 532.

It is understood that the electrical output signal 342 is an electrical current signal with a tone at the frequency f and an amplitude proportional to $\cos(\phi_{mod}+\phi_{atmosphere}+\phi_{correction})$, where $\phi_{atmosphere}$ and $\phi_{correction}$ are the phases attributed to the atmospheric disturbance 502 and the correction made by the phase modulator 404. The electrical output signal 342, after being digitized and mixed with the dither signal 532 at the dither modulator 510, includes a mixed signal 512 with a DC component and a tone at $2f_d$. The mixed signal 512 is passed through the filter 520 (e.g., a low-pas filter) to filter out the tone at $2f_d$ for integration by the integrator 522 to generate the control signal 532, which controls the phase of each phase modulator (e.g., 404-1) of the phase modulator 404. Examples of the processor 540 include a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or any other suitable device that can perform calculations or other manipulations of information.

In one or more aspects, the controller 350 uses the processor 440 to estimate a desired phase of a dephased optical channel signal as an initial phase value (e.g. of $\phi_{correction}$) and to increment the initial phase value in an optimization loop to maximize a power of the electrical output signal 342 (e.g., the heterodyne signal). In some aspects, the processor 440 may coordinate the functionalities of the controller 350, for example, by controlling the timings of the control signal 352 and the dither signal 532 and the functionalities of the control-signal generator 500.

The plot 550 shown in FIG. 5B illustrate frequency spectra 552, 554 and 556, respectively, associated with the dither signal, atmospheric disturbance, and the communication signal. The spectrum 552 associated with the dither signal is somewhere in between the spectra 554 and 556. The communication signal is the electrical output signal 342, which is a heterodyne signal.

FIGS. 6A through 6C are diagrams illustrating a cross-sectional view 600A of example fiber array collimator beams and corresponding phase diagrams 600B and 600C, according to certain aspects of the subject technology. The cross-sectional view 600A shows a spatial distribution of magnitudes of the LO laser beams as they enter the modulator 404 of FIG. 4B. The phase diagram 600B of FIG. 6B shows a spatial phase distribution of the communication signal after being disturbed (aberrated) by the atmospheric disturbance. The controller 350 of FIG. 5A is tasked with using the control signal 352 of FIG. 4A or 5A to dephase the LO laser beams, the magnitudes of which are shown in FIG. 6A. The dephasing results in a spatial phase distribution shown in the phase diagram 600C of FIG. 6C. As seen from FIGS. 6B and 6C, the spatial phase distribution of the phase diagram 600C is well matched with the spatial phase distribution of the aberrated signal as shown in the phase diagram 600B.

Figure 7:
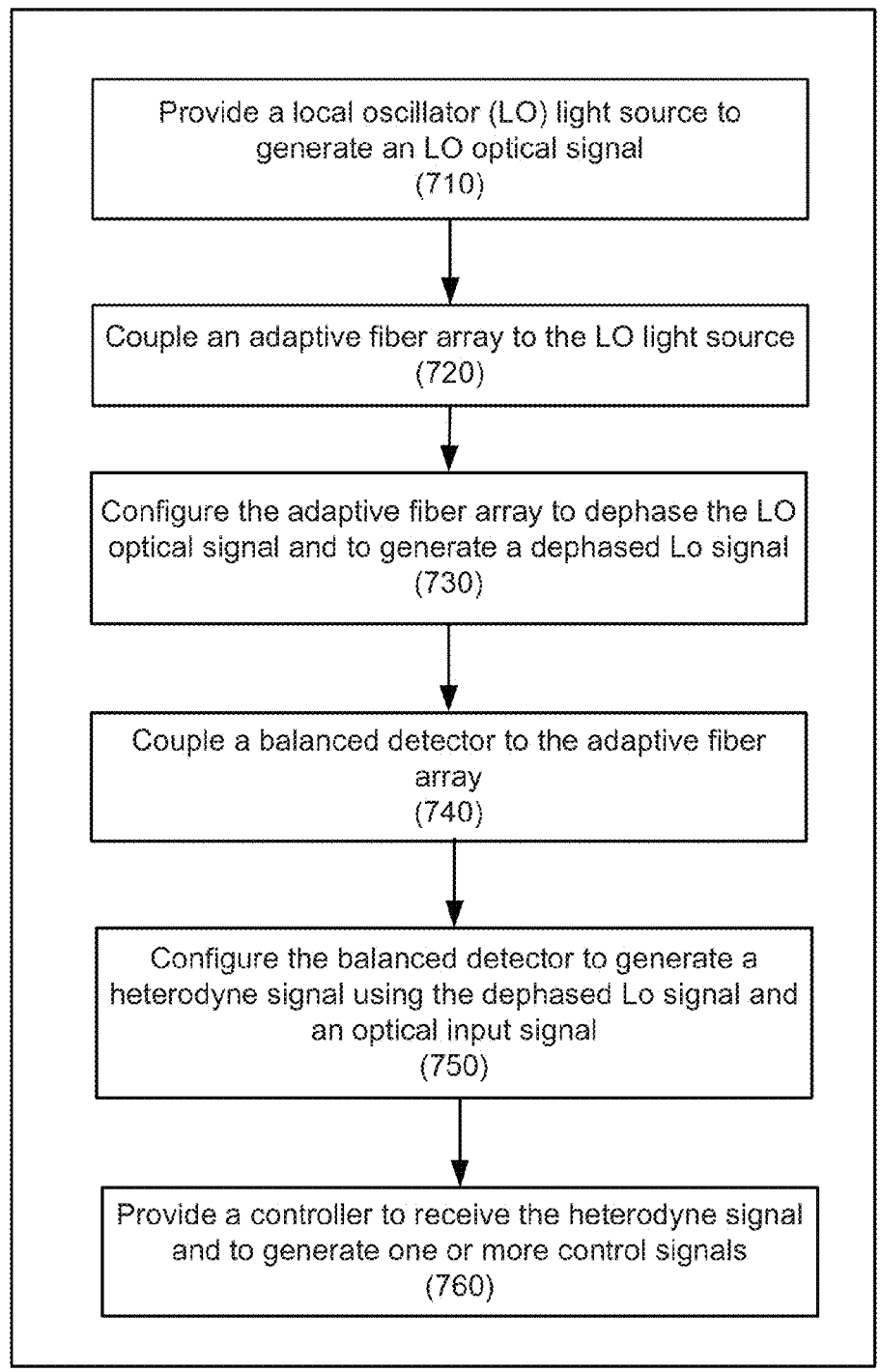
FIG. 7 is a flow diagram illustrating an example of a method for providing a coherent transceiver system, according to certain aspects.

FIG. 7 is a flow diagram illustrating an example of a method providing a coherent transceiver system (e.g., 400A of FIG. 4A) includes providing a local oscillator (LO) light source (e.g., 310 of FIG. 3, FIG. 4A, or FIG. 4B) to generate an LO optical signal (e.g., 312 of FIG. 3 or FIG. 4A) (710). An adaptive fiber array (e.g., 320 of FIG. 3 or FIG. 4A) is coupled to the LO light source (720). The adaptive fiber array is configured to dephase the LO optical signal and to generate a dephased LO signal (e.g., 322 of FIG. 3 or FIG. 4A) (730). A balanced detector (e.g., 340 of FIG. 3 or FIG. 4A) is coupled to the adaptive fiber array (740). The balanced detector is configured to generate a heterodyne signal (e.g., 342 of FIG. 3 or FIG. 4A) using the dephased LO signal and an optical input signal (e.g., 302 of FIG. 3 or FIG. 4A) (750). A controller (e.g., 350 of FIG. 3, FIG. 4A, or FIG. 5A) is provided to receive the heterodyne signal and to generate one or more control signals (e.g., 352 of FIG. 3, FIG. 4A, or FIG. 5A) (760). The adaptive fiber array is configured to utilizes the one or more control signal to dephase the LO optical signal (see 600C of FIG. 6C).

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A coherent transceiver system, the system comprising:
a local oscillator (LO) light source configured to generate an LO optical signal;
an adaptive fiber array coupled to the LO light source and configured to dephase the LO optical signal;
a balanced detector coupled to the adaptive fiber array and configured to receive a dephased LO signal from the adaptive fiber array and an optical input signal and to generate a heterodyne signal comprising a plurality of channel heterodyne signals, wherein the balanced detector comprises a beam splitter and optical couplers configured to generate a first and a second combined beam to be out of phase by 180 degrees, and the heterodyne signal comprises a difference between the first and the second combined beam; and
a controller configured to receive the heterodyne signal and to generate one or more control signals,
wherein the adaptive fiber array utilizes the one or more control signals to dephase the LO optical signal.

2. The system of claim 1, wherein the adaptive fiber array comprises a fiber splitter configured to split the LO optical signal into a plurality of optical channel signals, wherein an optical channel signal of the plurality of optical channel signals is associated with a channel wavelength, and wherein the adaptive fiber array is configured to match a phase of the LO optical signal with a phase of the optical input signal based on the one or more control signals.

3. The system of claim 2, wherein the adaptive fiber array further comprises a plurality of electro-optical (EO) phase modulators, wherein an EO phase modulator of the plurality of EO phase modulators comprises a lithium niobate crystal modulator.

4. The system of claim 3, wherein the EO phase modulator is configured to receive a control signal of the one or more control signals and to adjust a phase of the optical channel signal based on the control signal to generate a dephased optical channel signal.

5. The system of claim 4, wherein the adaptive fiber array further comprises a plurality of fiber array collimators, wherein a fiber array collimator of the plurality of fiber array collimators is configured to collimate the dephased optical channel signal.

6. The system of claim 5, wherein the beam splitter is configured to split the optical input signal and the dephased LO signal into the first and the second combined beam.

7. The system of claim 1, wherein the controller comprises a hill-climbing controller and is configured to facilitate estimating a desired phase of the dephased optical channel signal using a dither signal for each optical channel.

8. The system of claim 7, wherein the controller is configured to provide the dither signal to the EO phase modulator, and the EO phase modulator is configured to modulate a phase of the optical channel signal using the dither signal.

9. The system of claim 7, wherein the controller comprises a demodulator and a filter and is configured to demodulate and filter the channel heterodyne signal of the plurality of channel heterodyne signals using the demodulator and the filter.

10. The system of claim 7, wherein the controller is configured to use an estimated desired phase of the dephased optical channel signal as an initial phase value and increments the initial phase value in an optimization loop to maximize a power of the heterodyne signal.

11. A method of providing a coherent transceiver system, the method comprising:
providing a local oscillator (LO) light source to generate an LO optical signal;
coupling an adaptive fiber array to the LO light source;
configuring the adaptive fiber array to dephase the LO optical signal and to generate a dephased LO signal;
coupling a balanced detector to the adaptive fiber array, the balanced detector comprising a beam splitter and optical couplers;
configuring the balanced detector to generate a heterodyne signal comprising a plurality of channel heterodyne signals using the dephased LO signal and an optical input signal;
configuring the beam splitter and the optical couplers to generate a first and a second combined beam to be out of phase by 180 degrees, wherein the heterodyne signal comprises a difference between the first and the second combined beam; and
providing a controller to receive the heterodyne signal and to generate one or more control signals,
wherein the adaptive fiber array is configured to utilizes the one or more control signal to dephase the LO optical signal.

12. The method of claim 11, wherein coupling the adaptive fiber array comprises coupling a fiber splitter, and wherein the method further comprises configuring the fiber splitter to split the LO optical signal into a plurality of optical channel signals, wherein an optical channel signal of the plurality of optical channel signals is associated with a channel wavelength.

13. The method of claim 12, further comprising configuring an electro-optical (EO) phase modulator of the adaptive fiber array to receive a control signal of the one or more control signals and to adjust a phase of the optical channel signal based on the control signal to generate a dephased optical channel signal.

14. The method of claim 13, further comprising collimating the dephased optical channel signal using a plurality of fiber array collimators.

15. The method of claim 13, wherein the beam splitter of the balanced detector is configured to split the optical input signal and the dephased LO signal into the first and the second combined beam.

16. The method of claim 15, further comprising:
configuring the controller to provide a dither signal to the EO phase modulator, and
configuring the EO phase modulator to modulate a phase of the optical channel signal using the dither signal.

17. The method of claim 15, further comprising configuring the controller to use an estimated desired phase of the dephased optical channel signal as an initial phase value and increments the initial phase value in an optimization loop to maximize a power of the heterodyne signal.

18. A free-space optical (FSO) communication system comprising:
at least two FSO transceivers:
an FSO transceiver of the at least two FSO transceivers coupled via an FSO modem to a network, wherein the FSO transceiver comprises:
a local oscillator (LO) light source configured to generate an LO optical signal;
an adaptive fiber array coupled to the LO light source and configured to dephase the LO optical signal;
a balanced detector coupled to the adaptive fiber array and configured to receive a dephased LO signal from the adaptive fiber array and an optical input signal and to generate a heterodyne signal comprising a plurality of channel heterodyne signals, wherein the balanced detector comprises a beam splitter and optical couplers configured to generate a first and a second combined beam to be out of phase by 180 degrees, and the heterodyne signal comprises a difference between the first and the second combined beam; and
a controller configured to receive the heterodyne signal and to generate one or more control signals,
wherein the adaptive fiber array utilizes the one or more control signal to dephase the LO optical signal.

19. The FSO communication system of claim 18, wherein the adaptive fiber array further comprises a plurality of fiber array collimators.

20. The FSO communication system of claim 19, wherein a fiber array collimator of the plurality of fiber array collimators is configured to collimate the dephased optical channel signal.

* * * * *